United States Patent
Böhm et al.

(10) Patent No.: US 6,230,141 B1
(45) Date of Patent: May 8, 2001

(54) SYNCHRONIZATION OF A TWO-CHANNEL AUDIO DECODER WITH A MULTICHANNEL AUDIO DECODER

(75) Inventors: Johannes Böhm; Ernst F. Schröder, both of Hannover (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/205,464

(22) Filed: Dec. 4, 1998

(30) Foreign Application Priority Data

Dec. 8, 1997 (DE) .............................. 197 54 296

(51) Int. Cl.[7] .......................... G11B 27/031; G10L 13/00
(52) U.S. Cl. ........................... 704/503; 704/200.1; 700/94
(58) Field of Search ................. 704/200.1, 503; 700/94

(56) References Cited

U.S. PATENT DOCUMENTS

| 5,508,816 | 4/1996 | Ueda et al. ........................... 358/341 |
| 5,818,547 | * 10/1998 | Ozaki ................. 348/425.4 |

FOREIGN PATENT DOCUMENTS

| 3122831 A1 | 11/1982 | (DE) | ................................. H04S/1/00 |
| 4202472 A1 | 8/1992 | (DE) | ................................. H04N/5/91 |
| 734 021 A2 | 9/1996 | (EP) | ................................. G11B/20/10 |
| 735 782 A2 | 10/1996 | (EP) | ................................. H04N/9/877 |
| 09018870 | 1/1997 | (JP) | ................................. H04N/7/24 |
| 97/21310 | 6/1997 | (WO) | ................................. H04N/7/52 |

OTHER PUBLICATIONS

German Search Report.

\* cited by examiner

Primary Examiner—Tālivaldis I. Šmits
(74) Attorney, Agent, or Firm—Joseph S. Tripoli; Eric P. Herrmann

(57) ABSTRACT

Dolby AC-3 and MPEG-2 audio permit the transmission of audio signals with more than two independent audio channels. If a reproduction device has only a two-channel audio decoder (DEC1) then an external multi-channel audio decoder (DEC2) can be used for multi-channel sound reproduction. If the audio reproduction at the same time accompanies video reproduction, then a synchronization method is required in order to achieve lip synchronism between picture and sound. According to the invention, for the synchronization of a first decoder (DEC1), which merely has two-channel compatibility, with a second decoder, which has multi-channel compatibility, a counting variable is allocated a value (F) which is produced from system parameters such as the data coding method used, the transmission speed and/or the data rate. The data are received by the first decoder and output by the latter to the second decoder, the counting variable being decremented or incremented respectively for a specific volume of data. When the counting variable reaches a value corresponding to the beginning of the decoding by the second decoder, the first decoder then begins decoding the data.

9 Claims, 3 Drawing Sheets

SYNCHRONIZATION OF A TWO-CHANNEL AUDIO DECODER WITH A MULTICHANNEL AUDIO DECODER

FIELD OF THE INVENTION

The invention relates to a method and an apparatus for the synchronization of a first decoder with a second decoder, in particular of an internal audio decoder of a DVD player with an external audio decoder of a multi-channel amplifier.

BACKGROUND OF THE INVENTION

Audio coding systems, such as Dolby AC-3 and MPEG-2 audio, permit the transmission of high-quality audio signals, including, in particular, the transmission of multi-channel sound. If the possible reproduction configurations are defined by "x,y", where x is the number of front channels and y is the number of surround channels, then, for example in the case of Dolby AC-3, the following reproduction configurations are possible: 3/2, 3/1, 2/2, 3/0, 2/1, 2/0, 1/0. In addition, a low-frequency channel can also be transmitted.

In order to enable such multi-channel sound reproduction, the transmitted audio data stream must first of all be decoded by a multi-channel audio decoder suitable for this purpose. However, if the device provided for reproduction contains merely a two-channel audio decoder, then multi-channel sound reproduction can be carried out only by using an external multi-channel audio decoder. The audio data are in this case output via a serial digital interface from the reproduction device to the multi-channel decoder. If the audio signals are intended to be output accompanying a video signal, such as, for example, during the playback of a film stored on a DVD, then a synchronization method is necessary in order to achieve lip synchronism between the picture and multi-channel sound reproduction.

SUMMARY OF THE INVENTION

The invention is based on the object of specifying such a method for the synchronization of a first decoder with a second decoder which is distinguished by simple method steps and little hardware outlay resulting therefrom.

The invention is based on the further object of specifying an apparatus for carrying out the method according to the invention.

In principle, the inventive method for the synchronization of a first decoder with a second decoder consists in the fact that a first value is allocated to a counting variable;
first data are received by the first decoder;
second data, which are identical to the received first data or are produced from the latter after processing, are output by the first decoder to the second decoder, the counting variable being decremented or incremented respectively for the outputting of a predetermined volume of data;
the first decoder begins decoding the first data when the counting variable assumes a second value, which corresponds to the beginning of the decoding of the second data by the second decoder.

In particular, the method can be employed if the first and second data contain multi-channel audio signals which are transmitted in frames which, in turn, can be subdivided into blocks.

In this case, the multi-channel audio signals have preferably been coded according to an MPEG-2 audio algorithm, Dolby AC-3 algorithm or another audio option of the DVD.

The method can be used in a particularly advantageous manner if the first decoder is a two-channel audio decoder and the second decoder is a multi-channel audio decoder.

It is advantageous for the counting variable to be allocated a first value which is produced from system parameters such as the data coding method, the transmission speed or the data rate.

The second decoder advantageously begins decoding when a predetermined fraction of a frame of the multi-channel audio signals has been transmitted or when the said frame has been completely transmitted.

In this case, the counting variable is decremented in a bit-by-bit, byte-by-byte or word-by-word manner.

It is furthermore advantageous if the first data are unpacked after reception by the first decoder and stored in a memory and, for outputting to the second decoder, are read from the memory and formatted.

In particular, the method is advantageous if the first decoder decodes audio signals from the first data, which audio signals are output synchronously with video signals which have been transmitted with the audio signals in a common data stream and have been decoded by a video decoder.

In principle, the inventive apparatus for the synchronization of a first decoder with a second decoder comprises an interface, via which second data can be output from the first decoder to the second decoder, and a counting register which is allocated a first value as a function of the coding method used for the second data and/or of the transmission speed of the interface and/or of the data rate of the interface, the counting register being incremented or decremented when the data are output via the interface, and, when the counting variable reaches a value corresponding to the beginning of the decoding of the data by the second decoder, the first decoder being fed a control signal, which initiates the decoding of first data by the first decoder.

The counting register is advantageously part of the first decoder, the counting register being allocated the first value by a system controller.

It is particularly advantageous if the first decoder contains, in addition to a processor for process control and decoding of the first data, one or more of the following units:

one or more memories for the storage of the first data on their reception and/or for buffer-storage in the event of processing of the first data;

an unpacker unit, which serves to unpack the received data into an elementary stream;

a formatting unit, which carries out formatting for serial outputting via the interface.

BRIEF DESCRIPTION OF THE DRAWINGS

Exemplary embodiments of the inventions are described with reference to the drawings, in which.

DETAILED DESCRIPTION OF PREFERRED EMBODIMENTS

Figure 1:
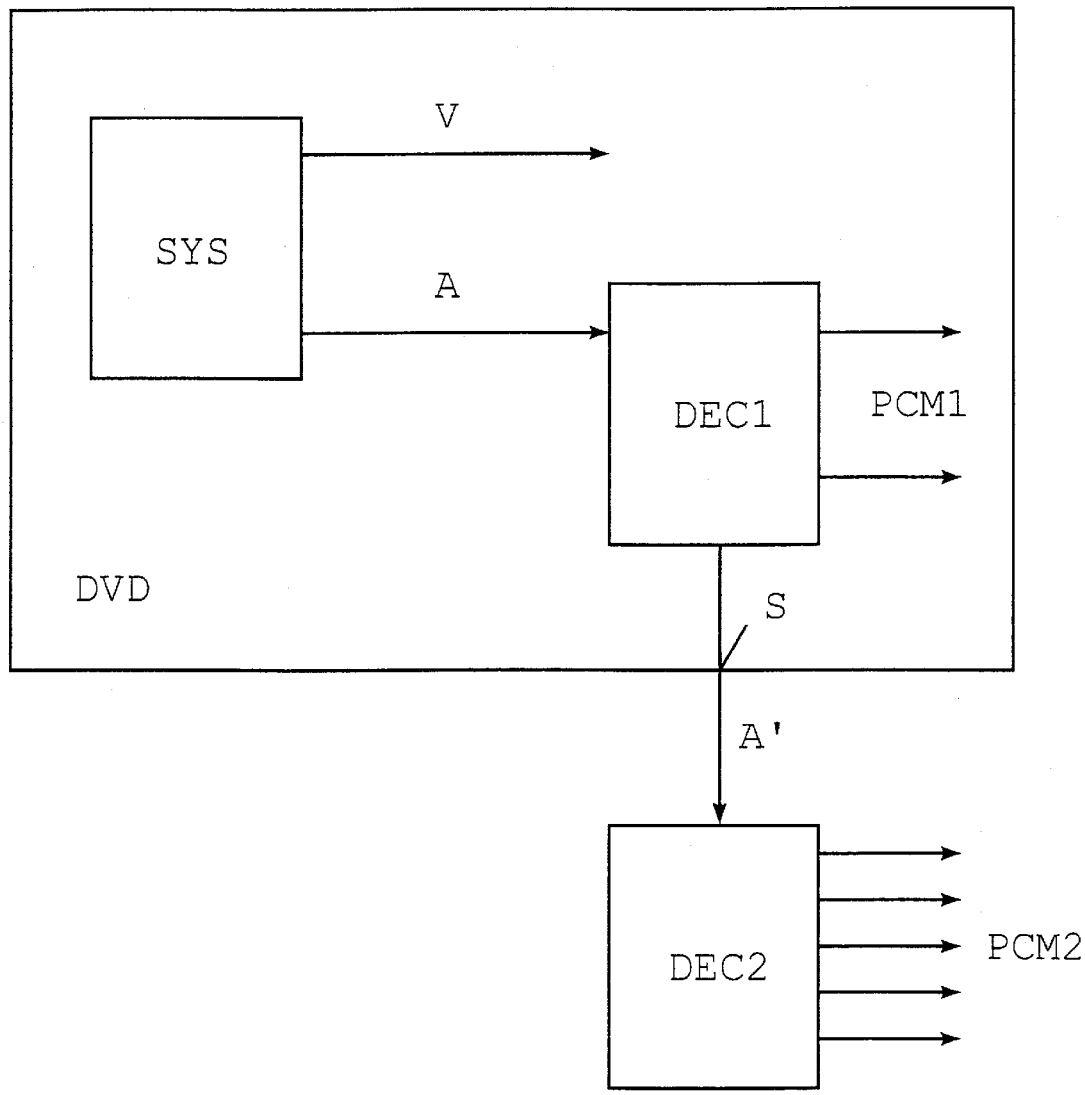
FIG. 1 shows an arrangement comprising a reproduction device with a two-channel audio decoder and an external multi-channel audio decoder.

FIG. 1 diagrammatically illustrates a DVD player DVD, to which an external multi-channel audio decoder DEC2 is connected. In this case, only those assemblies which are essential to the invention are illustrated; the remaining assemblies are familiar to a person skilled in the art and do not need to undergo any change in order to carry out the method according to the invention. The system controller and demultiplexer SYS supplies a video data stream V and an audio data stream A. Furthermore, it evaluates inter alia time markers contained in the data stream and sends commands for synchronization to the decoder DEC1. In addition to decoding the audio data, the decoder DEC1 also performs formatting for serial outputting of the data. Furthermore, the PES data stream is unpacked to form the elementary data stream. The elementary data stream is subjected to further signal processing until PCM audio signals PCM1 are output. Since the decoder DEC1 is merely a two-channel decoder, it can, moreover, merely output stereo signals. The data of the elementary data stream are likewise fed to the multi-channel audio decoder DEC2, via a serial interface, for example IEC 985 (IEC 1937) or IEC 1394. This decoder then effects multi-channel audio decoding of the data, which can be effected by using the so-called down-mixing technique as a function of the reproduction configuration. PCM audio signals PCM2 are then likewise output by the multi-channel audio decoder DEC2.

The synchronization of the two decoders DEC1 and DEC2 is performed in the following manner. The two-channel audio decoder DEC1 has a counting register which is set by the system controller SYS. The allocated value in this case depends on the coding method used, such as, for example, Dolby AC-3, MPEG-2 audio, DTS or SDDS, the transmission speed of the serial interface and/or the available data rate. The value of the counting variable is preferably taken from a table. The two-channel audio decoder DEC1 begins in each case immediately with the transmission of its received data, the following processes being carried out: after the data have been received and, if appropriate, also unpacked from the programme stream to form the elementary data stream, they are stored in a memory. For the outputting of the data, the latter are read again from the memory, formatted and then output via the serial interface. In this case, the counting register is decremented in the event of each reading from the memory. If the register reaches the value "0", then it signals to the two-channel audio decoder DEC1 that the multi-channel audio decoder DEC2 is beginning decoding and processing, and at this point in time the two-channel audio decoder DEC1 then likewise starts decoding and processing. As a result, synchronization between the two decoders DEC1 and DEC2 is then ensured.

Successful synchronization presupposes a suitable choice of the value of the counting variable on allocation to the counting register. The number of data words which is necessary in order to be able to begin decoding is preferably chosen for the value of the counting variable. The counting register is then reduced by one data word for each data word that is read. If the Dolby AC-3 method is used, then, at an AC-3 data rate of 448 kbps, the audio data are transmitted in frames having a size of in each case 896 words. An AC-3 decoder can begin decoding when, depending on the implementation, ⅔ of a frame or an entire frame is present. In this case, therefore, the register should be set with a value of 560 words, since this corresponds to about ⅔ of the 896 words. If an MPEG-2 audio coding method is used, then a complete frame must be present for the beginning of the decoding.

Figure 2:
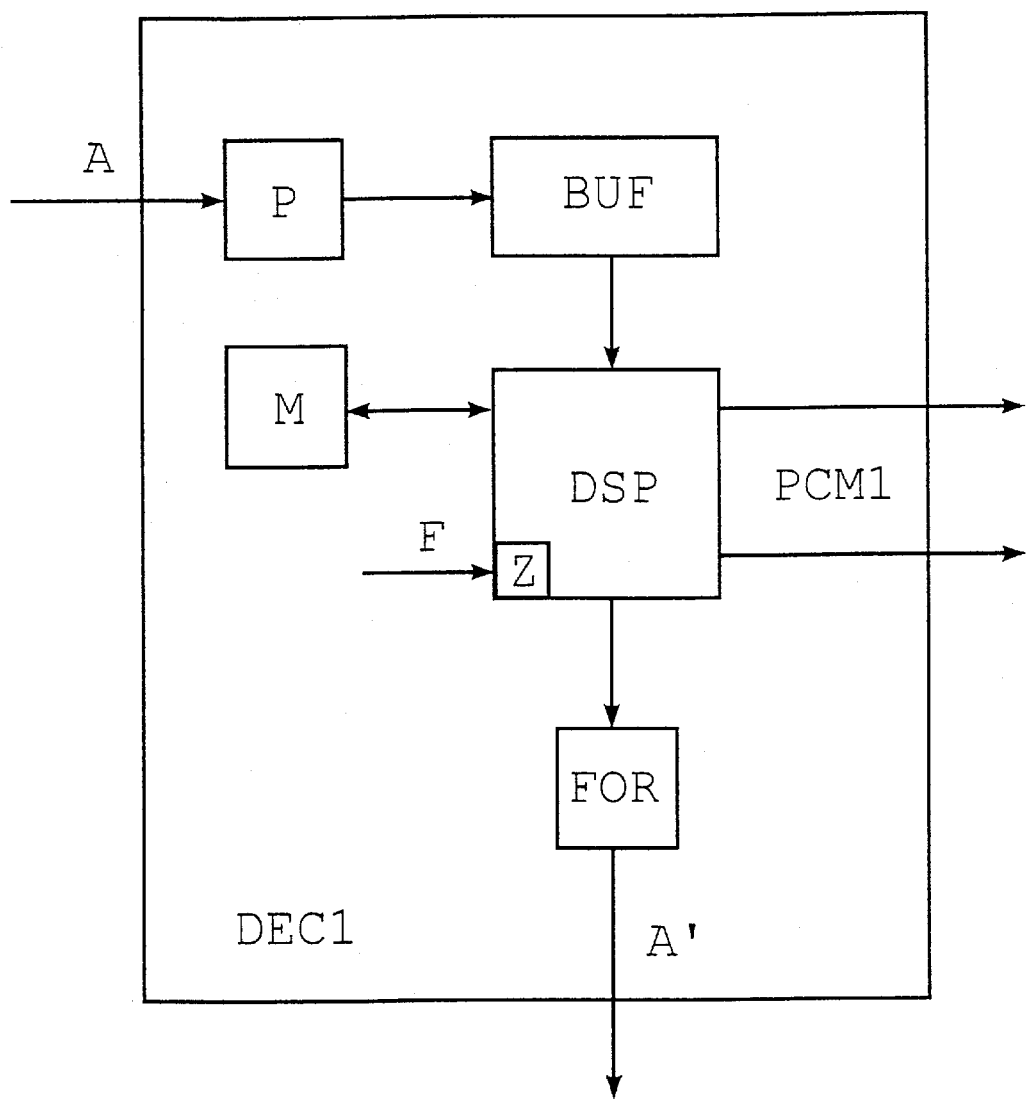
FIG. 2 shows a block diagram of the two-channel audio decoder.

FIG. 2 shows a block diagram of the decoder from FIG. 1. The audio data stream A is fed to an unpacker P, which unpacks the PES data stream to form the elementary data stream. The audio data of the elementary data stream are first of all stored in a buffer memory BUF and then fed to a processor unit DSP, which ensures process control and carries out the actual decoding of the data. A further memory M is provided for buffer-storage of the data. The data are fed to a formatter FOR, which outputs the formatted data A' for the purpose of serial outputting. The counting register Z is initially allocated a value F, which is then decremented in the event of each reading from the buffer memory BUF. When the value "0" is reached, the processor unit DSP then begins decoding. Finally, the decoded audio data PCM1 are then output.

Figure 3:
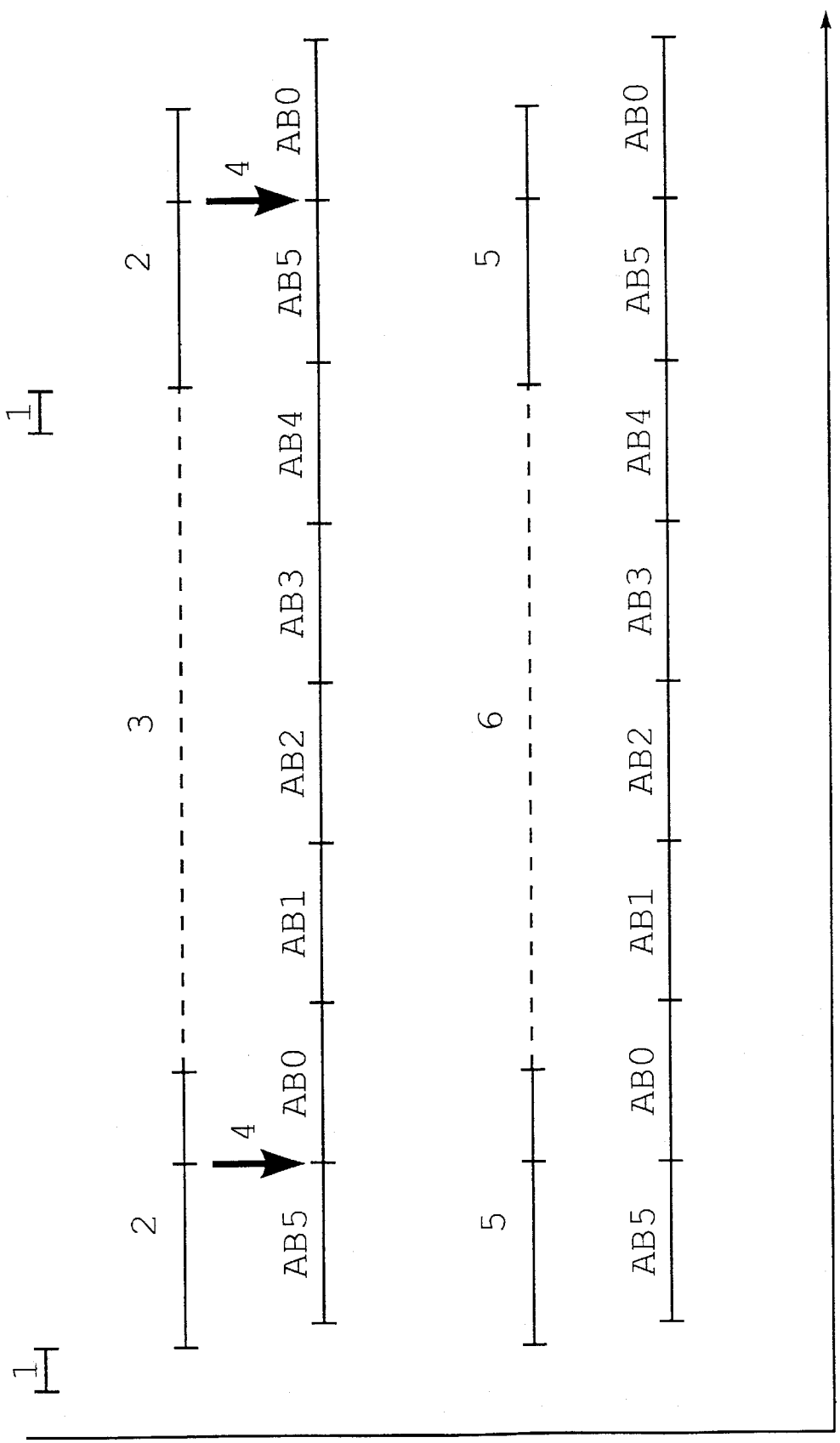
FIG. 3 shows the synchronous decoding of audio data by two decoders which are synchronized in accordance with the invention.

The synchronous decoding of the audio data by the two decoders DEC1 and DEC2 is illustrated in FIG. 3, using the example of Dolby AC-3-coded data. First of all, the data are read in with a burst 1 at a high data rate, for example 10 Mbps. The reading-in of a complete frame having a size of 896 words requires 1.43 ms. Immediately after the reading-in of the complete frame, the data are output 2 to the external decoder DEC2. This outputting also takes place in a burst, but at a lower data rate. Thus, a useful data burst rate of 1.536 Mbps is produced given use of an IEC 1937 interface for $f_s \approx 48$ kHz. This results in a transmission rate of 6.2 ms for ⅔ of a frame and 9.3 ms for a complete frame. After the complete frame has been transmitted, first of all no further data are transmitted, symbolized by the time interval 3. If ⅔ of a frame have been transmitted to the decoder DEC2, then the counting register reaches the value "0" and an internal interrupt 4 is generated. The decoding of the frame now begins, beginning with the first audio block AB0 and then continuing with the further audio blocks AB1, AB2, AB3, AB4 and AB5 of the frame. This is then followed by the decoding of the next frame. The burst input 5 of the data at decoder DEC2 is contemporaneous with the outputting of this frame by decoder DEC1. When ⅔ of the frame have been transmitted, decoder DEC2 immediately begins decoding the audio blocks AB0 to AB5, but without an internal interrupt being necessary for this purpose. In this case, too, time intervals 6, in which no useful data are transmitted, are present between the burst inputs.

The invention can be used for the synchronization of two arbitrary decoders. It is primarily suitable for the synchronization of an external multi-channel decoder with a two-channel audio decoder which is part of a reproduction device for audio and/or video data. The reproduction device may be a device for reading optical video discs, such as, for example, a DVD player, a digital video recorder, such as, for example, a DVC device, a television receiver for digital TV signals, a set-top box, other devices appertaining to consumer electronics, or else a computer. In particular, a use for DVD players is possible in order to enable synchronization of multi-channel audio signals, which are output by an external multi-channel AV receiver, with the video signal.

What is claimed is:

1. A method for synchronising a two-channel audio decoder with a multi-channel audio decoder, comprising:
    allocating a first value as a counting variable;
    conditioning said two-channel audio decoder to receive multi-channel audio signal as first data;
    outputting second data, which are representative of the received first data from the two-channel audio decoder to the multi-channel audio decoder;
    decrementing or incrementing said counting variable in accordance with the volume of data that is output;
    conditioning the two-channel audio decoder to begin decoding first data when the counting variable exhibits a second predetermined value, which corresponds to the beginning of decoding of the second data by the multi-channel audio decoder.

2. The method set forth in claim 1 wherein the first and second data contain multi-channel audio signals which are transmitted in frames which, in turn, can be subdivided into blocks.

3. The method set forth in claim 2 wherein the multi-channel audio signals have been coded according to an MPEG-2 audio or Dolby AC-3 algorithm.

4. The method set forth in claim 2 wherein the multi-channel audio decoder begins decoding when a predetermined fraction of a frame of multi-channel audio signals has been transmitted or when the said frame has been completely transmitted.

5. The method set forth in claim 1 wherein the counting variable is allocated a first value, which is produced from system parameters such as the data coding method, the transmission speed or the data rate.

6. The method set forth in claim 1 wherein the counting variable is decremented or incremented in one of a bit-by-bit, byte-by-byte and word-by-word manner.

7. The method set forth in claim 1 wherein the two-channel audio decoder decodes audio signals from the first data, which audio signals are output synchronously with video signals which have been transmitted with the audio signals in a common data stream and have been decoded by a video decoder.

8. Apparatus for synchronising a two-channel audio decoder with a multi-channel audio decoder, said apparatus comprising:

an interface for conveying second data from the two-channel audio decoder to the multi-channel audio decoder;

a counting register which is allocated a first value as a function of at least one of a coding method used for the second data, and a transmission speed of the interface, and a data rate of the interface, and wherein the counting register is incremented or decremented as a function of a volume of data output via the interface, and, said counting register providing a control signal to initiate decoding by the two-channel audio decoder when the counting variable reaches a value corresponding to a volume of data output by the interface which will enable the multi-channel audio decoder to begin decoding.

9. The apparatus set for the in claim 8 wherein the counting register is part of the first decoder and the counting register is allocated the first value by a system controller.

* * * * *